United States Patent
Saad et al.

(10) Patent No.: US 9,706,111 B2
(45) Date of Patent: Jul. 11, 2017

(54) NO-REFERENCE IMAGE AND VIDEO QUALITY EVALUATION

(71) Applicant: Intel Corporation, Santa Clara, CA (US)

(72) Inventors: Michele A. Saad, Austin, TX (US); Ramesh V. Jaladi, Santa Clara, CA (US); Philip J. Corriveau, Carlton, OR (US); Ralston A. Da Silva, Santa Clara, CA (US)

(73) Assignee: Santa Clara CA (US)

( * ) Notice: Subject to any disclaimer, the term of this patent is extended or adjusted under 35 U.S.C. 154(b) by 67 days.

(21) Appl. No.: 14/794,260

(22) Filed: Jul. 8, 2015

(65) Prior Publication Data

US 2017/0013191 A1    Jan. 12, 2017

(51) Int. Cl.
| | |
|---|---|
| *H04N 5/222* | (2006.01) |
| *H04N 5/232* | (2006.01) |
| *G06K 9/46* | (2006.01) |
| *G06T 7/00* | (2017.01) |
| *G06K 9/62* | (2006.01) |

(52) U.S. Cl.
CPC ....... *H04N 5/23222* (2013.01); *G06K 9/4642* (2013.01); *G06K 9/6269* (2013.01); *G06T 7/0002* (2013.01); *H04N 5/23293* (2013.01); *G06T 2207/20052* (2013.01); *G06T 2207/20076* (2013.01); *G06T 2207/30168* (2013.01)

(58) Field of Classification Search
CPC ................................................. H04N 5/23222
USPC ....................................... 348/207.99, 333.02
See application file for complete search history.

(56) References Cited

U.S. PATENT DOCUMENTS

| | | | | |
|---|---|---|---|---|
| 6,727,948 B1 * | 4/2004 | Silverbrook | ......... | B41J 2/17513 |
| | | | | 348/345 |
| 8,594,385 B2 * | 11/2013 | Marchesotti | ........... | G06K 9/036 |
| | | | | 382/112 |
| 8,634,657 B2 * | 1/2014 | Sakamoto | .......... | H04N 5/23219 |
| | | | | 382/190 |
| 8,928,768 B2 * | 1/2015 | Sugihara | .............. | H04N 1/2112 |
| | | | | 348/222.1 |
| 9,060,129 B2 * | 6/2015 | Sakane | .............. | H04N 5/23293 |
| 9,262,696 B2 * | 2/2016 | Ratcliff | .............. | H04N 5/23222 |
| 9,338,348 B2 * | 5/2016 | Sivan | .................. | H04N 5/23222 |
| 9,357,752 B2 * | 6/2016 | Collinson | .............. | A01K 47/06 |
| 2006/0164522 A1 * | 7/2006 | Komori | ................ | G11B 27/322 |
| | | | | 348/231.99 |

(Continued)

OTHER PUBLICATIONS

Moorthy et al., "A two-step framework for constructing blind image quality indices", IEEE Signal Processing Letters, vol. 17, No. 5, pp. 587-599, May 2010.

(Continued)

*Primary Examiner* — Anthony J Daniels
(74) *Attorney, Agent, or Firm* — Green, Howard & Mughal LLP

(57) ABSTRACT

Techniques related to no-reference image and video quality evaluation are discussed. Such techniques may include generating, for a still image or video frame, features including a natural scene statistics based feature and an image quality based feature and determining an image evaluation indicator associated with the still image or video frame based on a mapping of the generated features to the image evaluation indicator.

24 Claims, 7 Drawing Sheets

(56) References Cited

U.S. PATENT DOCUMENTS

| | | | |
|---|---|---|---|
| 2011/0075930 A1* | 3/2011 | Cerosaletti | G06K 9/00677 |
| | | | 382/190 |
| 2012/0057795 A1* | 3/2012 | Konishi | G06K 9/32 |
| | | | 382/195 |
| 2014/0050357 A1* | 2/2014 | Benhimane | G06T 7/0044 |
| | | | 382/103 |

OTHER PUBLICATIONS

Moorthy et al., "Blind image quality assessment: From scene statistics to perceptual quality", IEEE Transactions on Image Processing, vol. 20, No. 12, pp. 3350-3364, Dec. 2011.

Sheikh et al., "An information fidelity criterion for image quality assessment using natural scene statistics", IEEE Transactions on Image Processing, vol. 14, No. 12, pp. 2117-2128, Dec. 2005.

Sheikh et al., "Image information and visual quality", IEEE Transactions on Image Processing, vol. 15, No. 2, pp. 430-444, Feb. 2006.

Wang et al., "Image quality assessment: From error visibility to structural similarity", IEEE Transactions on Image Processing, vol. 13, No. 4, pp. 600-612, Apr. 2004.

\* cited by examiner

NO-REFERENCE IMAGE AND VIDEO QUALITY EVALUATION

BACKGROUND

In image quality evaluation and/or camera evaluation contexts, such evaluations may attempt to provide a quantitative or qualitative quality assessment of the images or camera used to attain such images. Current techniques for objective quality assessment of images or cameras may have numerous drawbacks and limitations. For example, techniques that use reference images may require a laboratory environment with controlled lighting and an imaging expert to perform controlled test image comparisons against reference charts of various types. Such expensive, time consuming, and onerous benchmarking methods have prevented consistent adoption by the industry, technical press, and consumers. Furthermore, such techniques may estimate individual quality aspects, but may not assess overall human perceptual quality. For example, such techniques may be trained on image databases with single, linear distortions that cannot reliably assess consumer images that contain multiple, subtle and complex distortions.

Current no-reference image quality assessment techniques may perform relatively well with linear simulated distortions, but do not provide the sophistication or accuracy necessary to provide reliable quality evaluation results for real world photos. For example, such techniques may fail to predict image quality accurately and in agreement with human subjective judgments on consumer-type photos captured by consumer devices such as phones and tablets.

It may be advantageous to perform no-reference image and video quality evaluations that are accurate and in agreement with human subjective judgments. It is with respect to these and other considerations that the present improvements have been needed. Such improvements may become critical as the desire to evaluate images, video, and cameras becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
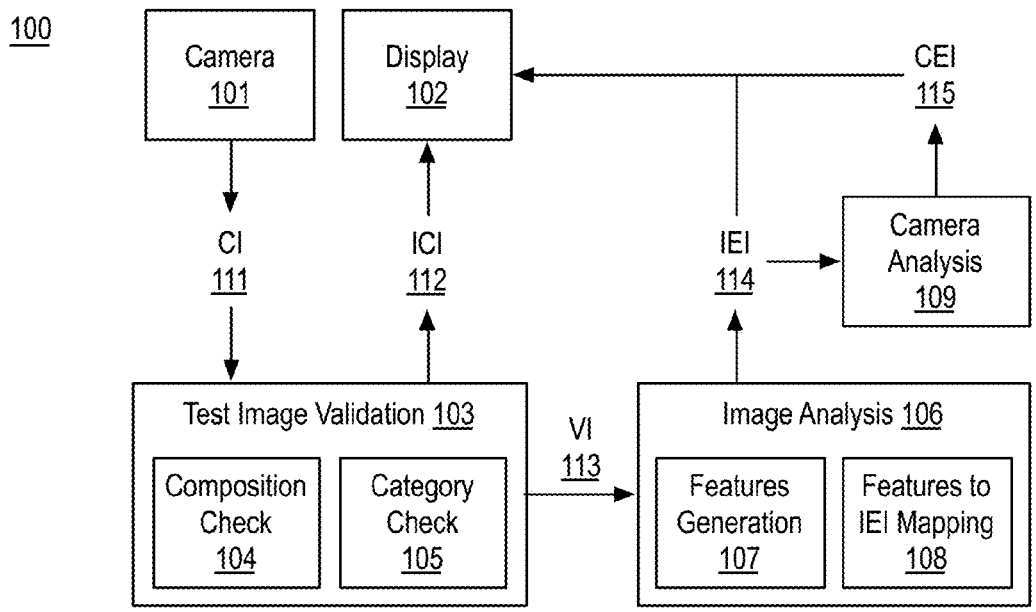
FIG. 1 illustrates an example device for performing no-reference image, video, or camera evaluation.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to no-reference image and video quality evaluation and, in particular, to mapping features including a natural scene statistics based feature and an image quality based feature to an image evaluation indicator.

As described above, in image quality evaluation and/or camera evaluation contexts, it may be desirable to perform no-reference image or video quality evaluations that are accurate and in agreement with human subjective judgments. In some embodiments discussed herein, performing no-reference image or video evaluation may include determining a candidate image is a valid image for quality evaluation. The candidate image may be any suitable image or image data such as a still image or a video frame or the like. For example, as used herein, the term image may include any suitable image, image data, video frame, video frame data, or the like. The determination that the candidate image is a valid image may be based on a composition check (e.g., determining whether the candidate image has a feature or features, such as a percentage of the candidate image including flat regions or the like, that indicate the candidate image is suitable for quality evaluation) or a category check (e.g., determining whether the candidate image belongs to a category that is suitable or desirable for quality evaluation) or both.

For valid images, features associated with the image may be determined such that the features include one or more natural scene statistics based features and one or more image quality based features. For example, natural scene statistics based features may be determined based on transforming patches of the valid image to the discrete cosine transform (DCT) domain, fitting generalized Gaussian distributions (GDD) to histograms of frequencies of the DCT coefficients, partitioning the GDD parameters based on orientation or frequency bands, and determining the one or more natural scene statistics based features based on the partitioned GDD parameters, as is discussed further herein. The one or more image quality based features may include, for example, a sharpness, a noise, a dynamic range, an illumination, or the like of the valid image.

Such features may be mapped to an image evaluation indicator associated with the valid image. For example, the mapping may be performed via a machine learning operator such as a support vector machine, a neural network, a deep neural network, or the like. The machine learning operator may be pretrained based on a training set of images and/or continuously trained as additional images are added to the training set. In some embodiments, the mapping may include a dynamically trained mapping. The image evaluation indicator may be any suitable indicator or indicators such as a score (e.g., ranging from 1 to 5 or 1 to 10 or the like) or a subjective label (e.g., poor, good, excellent, etc.) or the like. Furthermore, in some examples, a camera evaluation indicator associated with a camera used to capture the valid image may be determined based on the image evaluation indicator and multiple other image evaluation indicators generated for images captured with the same camera. Such a camera evaluation indicator may be generated by averaging the image evaluation indicators or the like and the camera evaluation indicator may have similar characteristics with respect to the image evaluation indicator. In some examples, image evaluation indicators for video frames may be averaged across video frames of the same or different video sequences to generate an overall video evaluation indicator.

The techniques discussed herein may provide for a framework for no-reference image, video, and/or camera quality evaluation based on consumer imaging content. Such techniques may provide for benchmarking, consumer photo or video evaluation, consumer camera evaluation, no-reference quality assessment, and the like. For example, the techniques discussed herein may provide for objectively benchmarking the quality of consumer images, video, and/or cameras using no-reference image quality evaluation of consumer images or video captured by the test device.

FIG. 1 illustrates an example device 100 for performing no-reference image, video, or camera evaluation, arranged in accordance with at least some implementations of the present disclosure. As shown in FIG. 1, device 100 may include a camera 101, a display 102, a test image evaluation module 103, an image analysis module 106, and a camera analysis module 109. Furthermore, test image evaluation module 103 may include a composition check module 104 and a category check module 105 and image analysis module 106 may include a features generation module 107 and a features to image evaluation indicator (IEI) mapping module 108.

As shown, device 100 may capture a candidate image (CI) 111 via camera 101. As used herein, the term camera may include any device capable of capturing an image or image data and/or any associated circuitry for generating such an image or image data such as an image processor or the like. For example, a camera may be characterized as an imaging device or a device or the like. In some examples, the camera may be provided via a mobile device or the like as discussed herein. In some examples, candidate image 111 may be a candidate image for image evaluation. In some examples, device 100 may provide image capture indicators (ICI) 112 to display 102 to support a user in capturing candidate image 111. For example, image capture indicators 112 may provide image capture instructions, suggestions, examples, or the like via display 102 to a user such that the user may more readily capture valid images. Furthermore, device 100 may determine, via test image validation module 103, whether candidate image 111 is a valid image (VI) 113 for quality evaluation (or whether candidate image 111 should be discarded for such purposes).

If candidate image 111 is valid, test image validation module 103 may provide valid image 113 to image analysis module 106, which may, via features generation module 107, generate features based on valid image 113 and, via features to image evaluation indicator mapping module 108, map such features to an image evaluation indicator (IEI) for valid image 113. As shown, image evaluation indicator 114 may be provided to a user via display 102. In addition or in the alternative, image evaluation indicator 114 may be provided to camera analysis module 109, which may generate a camera evaluation indicator (CEI) 115 based on image evaluation indicator 114 and additional image evaluation indicators generated based on images attained via camera 101. As shown, camera evaluation indicator 115 may be provided to a user via display 102.

Device 100 may be any suitable form factor device such as a computer, a laptop computer, a tablet, a smart phone, a phablet, a digital camera, a gaming console, a wearable device, a display device, a personal computer system, a cloud computing system, or the like. As shown, in some examples, device 100 may include camera 101, display 102, test image validation module 103, image analysis module 106, and camera analysis module 109. In such contexts, device 100 may capture images, determine image evaluation indicators and/or camera evaluation indicators, and display such indicators via display 102.

In other examples, device 100 may not include one or both of camera 101 and display 102. In examples where device 100 does not include camera 101 (or device 100 includes camera 100 but images attained via another camera are to be processed), candidate image 111 may be received via a file transfer to device 100 or the like. In examples where device 100 does not include display 102 (or device 100 includes display 102 but it desirable to transmit the results to another device), device 100 may provide image evaluation indicator 114 and/or camera evaluation indicator 115 to a remote device via a communication link over a network or the like. For example, the image capture capability, the results presentment capability, or the image and/or camera evaluation capability of device 100 may be provided via a separate device.

In some examples, device 100 may be a personal computer system (e.g., having at least data processing capabilities and including test image validation module 103, image analysis module 106, or camera analysis module 109 implemented via a central processor or the like). Such a personal computer system may have any form factor (e.g., desktop computer, laptop computer, tablet, smart phone, phablet, and so on) and may, in some examples, include camera 101 and/or display 102. In some examples, device 100 may be a cloud computing system having at least data processing capabilities and including test image validation module 103, image analysis module 106, or camera analysis module 109 implemented via one or more central processors or the like. Such a cloud computing system may have any suitable form factor such as a server, a server resource, or the like. In an example, an image may be captured via a mobile device, uploaded to a cloud computing environment for quality evaluation, and the resultant image evaluation indicator may be downloaded back to the device for display to a user. For example, an evaluation as to whether the image is a valid image may be performed by the mobile device or the cloud computing environment.

As discussed, camera 101 may capture candidate image 111 and/or device 100 may receive candidate image 111 for processing. Candidate image 111 may include any suitable image, picture, or frame of video or the like or any suitable data representing an image, picture, or frame of video. For example, candidate image 111 may include any suitable image or imaging data. In some examples, candidate image 111 may be received from an image sensor, an image signal processor, or the like associated with camera 101 or a remote camera as discussed herein. Candidate image 111 may be in any suitable format and/or color space. For example, candidate image 111 may include pixel values for each pixel of a candidate image and the pixel values may be provided for each channel of a color space such as the RGB (red green blue) color space, the YUV (Y luminance, U chroma, and V chroma) color space, or the like. Furthermore, candidate image 111 may include values for any number of pixels for any number or types of input image(s). For example, candidate image 111 may include a static image, an image frame of a video sequence, portions thereof (e.g., a slice or section of an image), or the like. In some examples, candidate image 111 may include a video frame in a format such as video graphics array (VGA), high definition (HD), Full-HD (e.g., 1080p), or 4K resolution video, or the like. Furthermore, candidate image 111 may include any number of images, pictures, or frames of video, or the like.

Test image validation module 103 may receive candidate image 111 and test image validation module 103 may determine whether candidate image 111 is a valid image for quality evaluation. If so, test image validation module 103 may provide candidate image 111 as valid image 113 to image analysis module 106. If not, test image validation module 103 may discard candidate image 111 for the purposes of quality evaluation. Test image validation module 103 may determine whether candidate image 111 is a valid image for quality evaluation using any suitable technique or techniques. In some examples, test image validation module 103 may perform a composition check (e.g., via composition check module 104) to determine whether one or more composition parameters associated with candidate image 111 indicate candidate image is a valid image for quality evaluation. In some examples, test image validation module 103 may perform a category check (e.g., via category check module 105) to determine whether candidate image 111 is a member of a valid category for quality evaluation. In some examples, test image validation module 103 may perform both a composition check and a category check.

Figure 2:
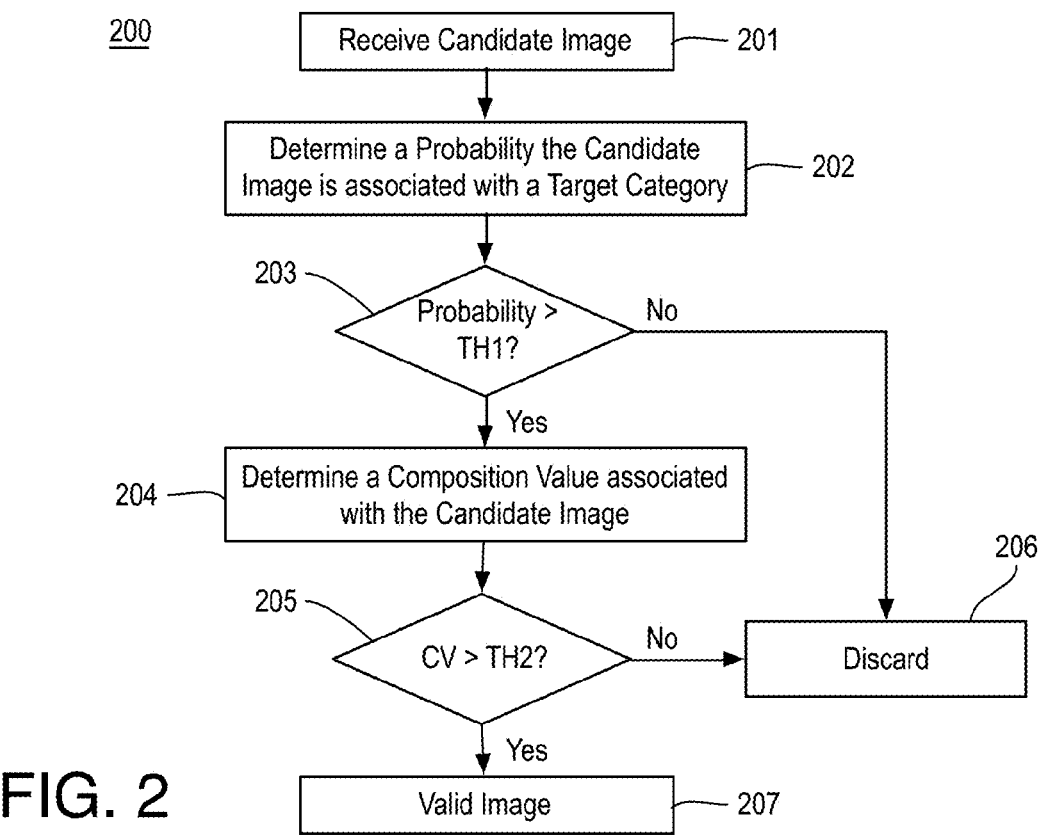
FIG. 2 illustrates an example process for determining whether a candidate image is a valid image for quality evaluation.

FIG. 2 illustrates an example process 200 for determining whether a candidate image is a valid image for quality evaluation, arranged in accordance with at least some implementations of the present disclosure. Process 200 may include one or more operations 201-207 as illustrated in FIG. 2. Process 200 may be performed by a device (e.g., device 100 or any other devices or systems discussed herein) or portions of process 200 may be performed by a device to determine whether a candidate image is a valid image for quality evaluation. Process 200 or portions thereof may be repeated for any number candidate images, pictures, frames of video, or the like. For example, process 200 may provide for valid images that provide statically valid samples of consumer relevant real world test photos.

As shown, process 200 may begin at operation 201, "Receive Candidate Image", where a candidate image may be received. The candidate image may be any candidate image discussed herein and may be received via any suitable technique or techniques such as image capture via a camera or a file transfer or the like.

Processing may continue at operation 202, "Determine a Probability the Candidate Image is associated with a Target Category", where a probability the candidate image is associated with a target category may be determined. The probability the candidate image is associated with a target category may be determined using any suitable technique or techniques. For example, as is discussed further herein, it may be desirable that a candidate image be associated with a valid category for evaluating image quality and/or that the candidate image is associated with a particular category.

For example, valid or desirable categories for evaluating image quality may include a landscape category (e.g., the image may include an outdoor scene), an indoor arrangement category (e.g., the image may include an indoor scene including an arrangement of common objects), an indoor flat surface category (e.g., the image may include an indoor scene including flat surfaces such as walls or the like), an outdoor night category (e.g., the image may include an outdoor scene attained at night and/or in low light conditions), a selfie category (e.g., the image may include a person who is also taking the image), or the like. Other valid or desirable categories may be provided.

As discussed, the probability the candidate image is associated with a target category may be determined using any suitable technique or techniques. In some examples, the probability may be determined based on natural scene statistics associated with the candidate image. Such natural scene statistics may be any suitable natural scene statistics such as those generated as discussed herein with respect to process 400 or the like. Such natural scene statistics may be provided to a mapping operation or the like which may associate the natural scene statistics with a likelihood the candidate image is associated with one or more of the target categories. Such a mapping may be performed via any suitable machine learning operator or the like such as a support vector machine, a neural network, a deep neural network, or the like. Such a machine learning operator may be pretrained based on a training image set or the like. In some examples, the probability determined at operation 202 may be associated with a particular target category. In other examples, the probability determined at operation 202 may be associated with any target category (e.g., the probability may be a sum of the probabilities the candidate image is associated with each of the target categories).

Processing may continue at decision operation 203, "Probability>TH1?", where a determination may be made as to whether the probability determined at operation 202 is greater than (e.g., or greater than or equal to or not less than or the like) a predetermined threshold (e.g., TH1). The predetermined threshold may be any suitable value for evaluating whether the candidate image is a member of a particular target category or whether the candidate image is a member of any target category. For example, the threshold implemented at decision operation 203 may depend on the target category or categories for which the candidate image is being tested. In some examples, the candidate image may be tested for association with multiple target categories with the same or different thresholds.

As shown, if the probability is not greater than the threshold, process 200 may continue at operation 206, "Discard", where the candidate image may be discarded for the purposes of quality evaluation and/or a user may be prompted to capture another image (e.g., via a camera) or select another image (e.g., via file upload). For example, although the candidate image may be discarded for the purposes of quality evaluation, the candidate image may be retained for use by a user or the like. Also, as is discussed further with respect to image capture indicators 112 of FIG. 1, in such examples, a user may be prompted with indicators, instructions, or the like to use in capturing a subsequent image such that the subsequent image may be more likely to meet the target category or categories.

If the probability is greater than the threshold, process 200 may continue at operation 204, "Determine a Composition Value associated with the Candidate Image", where a composition value or values associated with the candidate image may be determined Such a composition value or values may include any suitable values determined using any suitable technique or techniques. For example, the composition value or values may include a percentage of the candidate image including flat regions, a texture value associated the candidate image, a percentage of the candidate image including textured regions, or the like.

Processing may continue at decision operation 205, "CV>TH2?", where a determination may be made as to whether the composition value determined at operation 204 is greater than (e.g., or greater than or equal to or not less than or the like) a predetermined threshold (e.g., TH2). The predetermined threshold may be any suitable value associated with the composition value and for evaluating whether the composition value indicates the candidate image will provide a suitable image for quality evaluation. For example, the threshold implemented at decision operation 204 may depend on the composition value or values for which the candidate image is being tested. In some examples, the candidate image may be tested to determine whether it passes two composition value tests or one of two or more composition value tests. In an example, at operation 204, a flat region detector may be applied to the candidate image to determine a percentage of the candidate image including flat regions and, at operation 205, a composition check of the candidate image may be based on a comparison of the percentage to a threshold. For example, the flat region detector may be based on a codebook of flat image regions from natural scenes. In some examples, the flat region detector may be based on a codebook of Gabor-like decompositions modeled using generalized Gaussian distributions (GDD) and such GDD parameters may be used to classify whether a patch of the candidate image is flat or not.

As shown, if the composition value is not greater than the threshold, process 200 may continue at operation 206, "Discard", where the candidate image may be discarded for the purposes of quality evaluation as discussed and/or a user may be prompted to capture another image (e.g., via a camera) or select another image (e.g., via file upload). Also, as is discussed further with respect to image capture indicators 112 of FIG. 1, in such examples, a user may be prompted with indicators, instructions, or the like to use in capturing a subsequent image such that the subsequent image may be more likely to meet the target category or categories.

If the composition value is greater than the threshold, process 200 may continue at operation 207, "Valid Image", where the candidate image may be determined to be a valid image for quality evaluation. As illustrated with respect to process 200, in some examples, determining whether a candidate image is a valid image may include a category check (e.g., via operation 202 and decision operation 203) and a composition check (e.g., via operation 203 and decision operation 204). In other examples, either the category check or the composition check may be skipped. Furthermore, as discussed with respect to decision operation 203, 205, in some examples, a determination may be made as to whether the probability and the composition value are greater than (e.g., or greater than or equal to or not less than) their associated thresholds. In other examples, the probability or the composition value or both may be determined and compared to thresholds to determine whether they are less than, less than or equal to, not greater than a threshold, or multiple thresholds may be applied and the probability or the composition value or both may have to be between such thresholds.

Returning to FIG. 1, as discussed, device 100 may provide to a user via image capture indicators 112 and display 102, image capture instructions, suggestions, examples, or the like. Such image capture instructions, suggestions, examples, or the like may be provided prior to a user capturing candidate image 111, during the capture of candidate image 111, or subsequent to a determination candidate image 111 is not a valid image. Such image capture instructions, suggestions, examples, or the like may include any suitable indications (e.g., visual via a display or audio via a speaker, not shown, or tactile) to provide instruction to a user of device 100.

For example, device 100 may implement software to guide a user in capturing statistically valid samples of consumer relevant real world test photos within one or more specified image categories or the like. Also, as discussed, test image validation module 103 may test captured images to detect variations from the defined test images and/or provide feedback to a user for capturing subsequent candidate images.

For example, the discussed categories and/or composition characteristics of valid images may provide a statistically valid image and/or a statistically valid sample set of images for quality evaluation. Such a statistical framework of test images or inputs may be defined for the capture of consumer centric images that may be the basis for reliably modeling image quality predictions. Such techniques may provide for a range of consumer centric images (e.g., attainable in the real world by a user) to be used for quality evaluation. To enable the capture by a user of such a statistically valid image or images, guidance may be provided via image capture indicators 112. Such guidance may include any suitable instructions, suggestions, examples, or the like.

In some examples, such guidance may be particular to a category check and/or a composition check of an image. For example, the guidance may provide elements of the target category (e.g., trees and grass for the landscape category), recommended illumination, (e.g., greater than 300 lux for an outdoor category such as the landscape category), distances to elements of the scene (e.g., greater than 15 feet for the landscape category), particular instructions (e.g., avoid direct sunlight for the landscape category), or example images for the category. In some examples, the guidance may include general image capture guidance such as avoiding direct sources of light, avoiding moving or animated objects (e.g., cars or people), avoiding reflective surfaces (e.g., glass or mirrors), avoiding the user's shadow, or the like. In some examples, the guidance may include composition guidance (e.g., describing how a scene should be composed), descriptions of objects or surfaces to include in the scene (e.g., the sky, flat regions of a wall). Also, such guidance may be provided in real-time as a user is attaining an image (either via a camera or image selection from a database of images) or via a document or the like prior attaining an image. Furthermore, as discussed herein, cameras may be compared for quality using no-reference image techniques. In some examples, a user may want to compare cameras and, in such examples, it may be advantageous to instruct the user to capture the same or similar scenes with the multiple cameras that are to be compared.

As discussed, such techniques may aid a user in attaining statistically valid, statistically representative, and consumer relevant images for quality evaluation. Such images may provide for an image or set of images that may yield image quality prediction results that correlate well with human visual perception.

As shown in FIG. 1, if test image validation module 103 determines candidate image 111 is a valid image (e.g., valid image 113), image analysis module 106 may receive valid image 113 from memory or test image validation module 103 for analysis. Image analysis module 106 may generate image evaluation indicator 114 using any suitable technique or techniques. In some examples, features generation module 107 may generate one or more natural scene statistics based features and one or more image quality based features. Such features may be mapped to an image evaluation indicator or score via a machine learning operator or the like.

Figure 3:
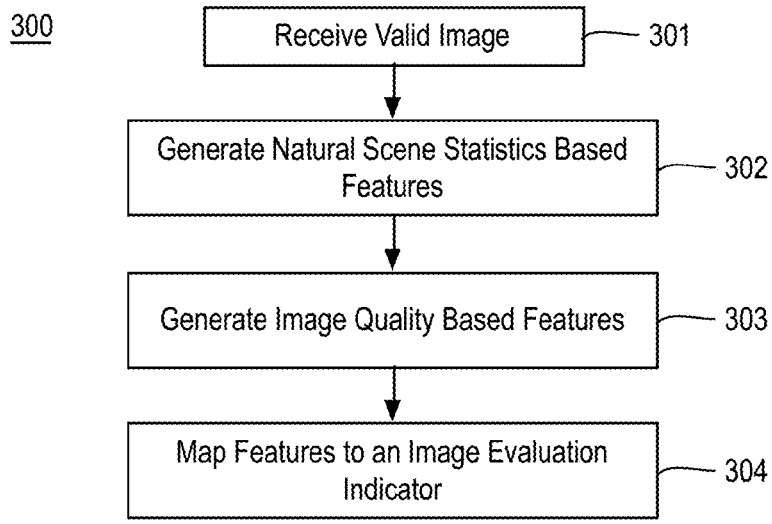
FIG. 3 illustrates an example process for generating an image evaluation indicator.

FIG. 3 illustrates an example process 300 for generating an image evaluation indicator, arranged in accordance with at least some implementations of the present disclosure. Process 300 may include one or more operations 301-304 as illustrated in FIG. 3. Process 300 may be performed by a device (e.g., device 100 or any other devices or systems discussed herein) or portions of process 300 may be performed by a device to generate an image evaluation indicator based on an image. Process 300 or portions thereof may be repeated for any number images, pictures, frames of video, or the like.

As shown, process 300 may begin at operation 301, "Receive Valid Image", where a valid image for quality evaluation may be received. The valid image may be any image discussed herein and may be received via any suitable technique or techniques such as image capture via a camera or a file transfer or the like.

Processing may continue at operation 302, "Generate Natural Scene Statistics Based Features", where one or more natural scene statistics based features may be generated for the image. The natural scene statistics based features may be generated using any suitable technique or techniques such as those discussed herein with respect to process 400. For example, generating the natural scene statistics based features may include transforming patches of the valid image to generate a plurality of sets of transform coefficients, fitting a probability distribution to each of multiple histograms each associated with a position within the sets of transform coefficients to generate probability distribution parameters, partitioning the probability distribution parameters based on orientation bands and/or frequency bands, and generating one or more features based on probability distribution parameters from the orientation bands and/or frequency bands.

Processing may continue at operation 303, "Generate Image Quality Based Features", where one or more image quality based features may be generated for the image. The image quality based features may include any suitable image quality based features generated using any suitable technique or techniques. For example, the image quality based features may include one or more of a sharpness of the valid image, a noise of the valid image, a dynamic range of the valid image, an illumination of the valid image, or the like.

Processing may continue at operation 304, "Map Features to an Image Evaluation Indicator", where the one or more natural scene statistics based features and the one or more image quality based features may be mapped to an image evaluation indicator. For example, the one or more natural scene statistics based features and the one or more image quality based features may be combined into a feature vector or the like and provided to a machine learning operator that may map the features to an image evaluation indicator. The machine learning operator may include any suitable machine learning operator such as a support vector machine, a neural network, a deep neural network, or the like. The machine learning operator may be pretrained based on a training image set and training image evaluation indicators, for example. In addition, the machine learning operator may be dynamically trained based on crowd-sourced image evaluation indicators and/or based on image evaluation indicators received from a user of the device. For example, the user may be provided the opportunity to personally rate the image and such a user score or rating may be used to train the machine learning operator. Such training may provide a personal or customized image quality preference for the user of the device, for example. The image evaluation indicator, as discussed, may include any suitable image evaluation indicator such as a score (e.g., from 1 to 5 or 1 to 10 or the like), a subjective label, or the like.

As discussed, the mapping performed at operation 304 may be based on one or more natural scene statistics based features and one or more image quality based features. Such techniques may provide an advantageous hybrid approach. For example, the natural scene statistics based features may provide a holistic approach to image quality that allows for prediction of image quality and the image quality based features may boost the accuracy of such predictions and may be useful in further quantifying specific quality dimensions that are important in human perception. Furthermore, as discussed with respect to operation 302, one or more natural scene statistics based features may be generated for an image.

Figure 4:
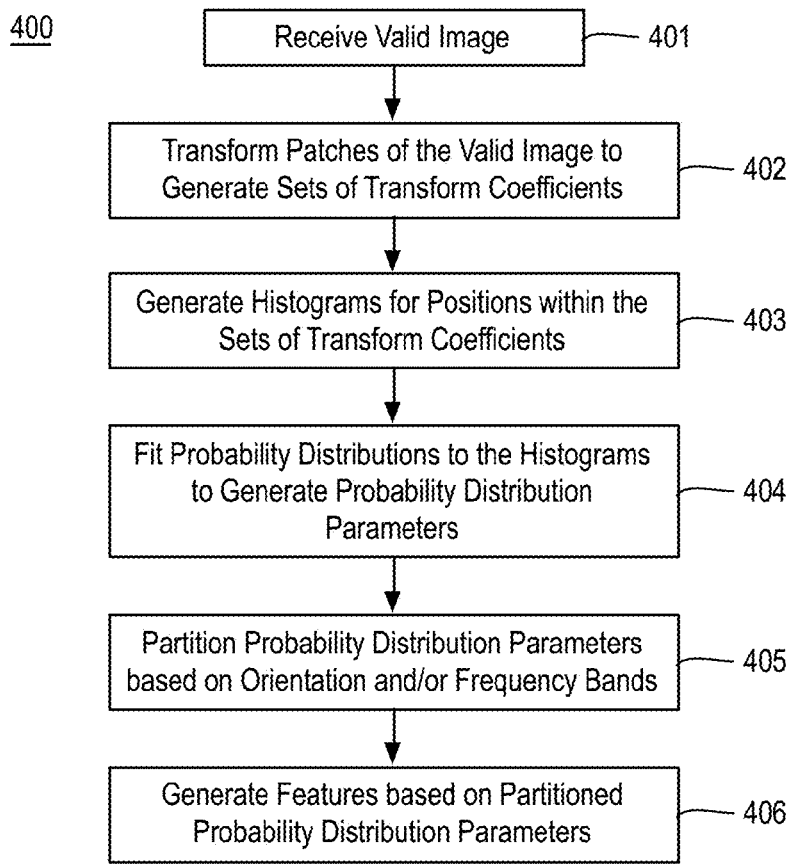
FIG. 4 illustrates an example process for generating natural scene statistics based features.

FIG. 4 illustrates an example process 400 for generating natural scene statistics based features, arranged in accordance with at least some implementations of the present disclosure. Process 400 may include one or more operations 401-406 as illustrated in FIG. 4. Process 400 may be performed by a device (e.g., device 100 or any other devices or systems discussed herein) or portions of process 400 may be performed by a device to generate one or more natural scene statistics based features. Process 300 or portions thereof may be repeated for any number images, pictures, frames of video, or the like.

As shown, process 400 may begin at operation 401, "Receive Valid Image", where a valid image for quality evaluation may be received. The valid image may be any image discussed herein and may be received via any suitable technique or techniques such as image capture via a camera or a file transfer or the like.

Processing may continue at operation 402, "Transform Patches of the Valid Image to Generate Sets of Transform Coefficients", where patches of the valid image may be transformed to generate sets of transform coefficients. For example, the valid image may be partitioned into patches or blocks or the like of any suitable size and the patches may be transformed to any suitable transform domain to generate the transform coefficients. The partitioning of the image into patches may be motivated, for example, due to receptive fields of the human visual cortex being localized in space. In some examples, the transform may be a discrete cosine transform (DCT) and the transform coefficients may be DCT coefficients. For example, the natural scene statistics based features discussed herein may be determined in the DCT domain.

Figure 5:
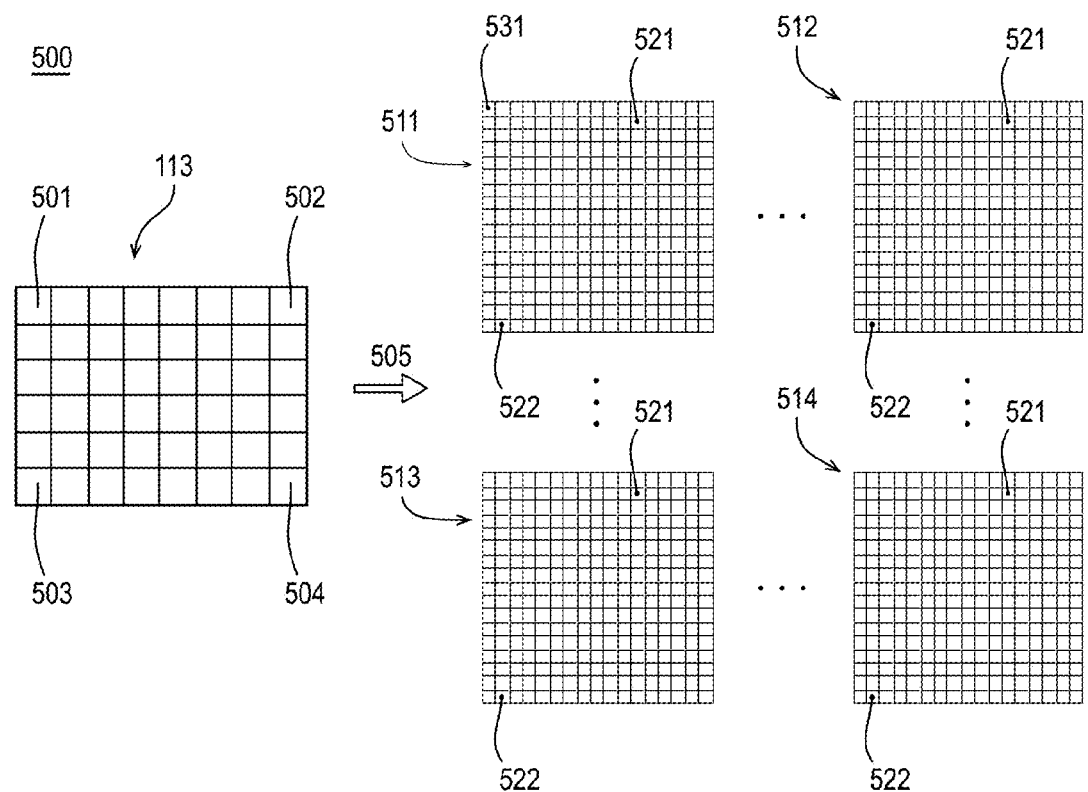
FIG. 5 illustrates an example transform of example patches to generate sets of transform coefficients.

FIG. 5 illustrates an example transform 500 of example patches to generate sets of transform coefficients, arranged in accordance with at least some implementations of the present disclosure. As shown in FIG. 5, valid image 113 may be partitioned into any number of patches such as patches 501-504 of any suitable size. In the example of FIG. 5, four patches 501-504 are labeled for the sake of clarity of presentation. For example, patches 501-504 may be square or rectangular and may have any size. In the example of FIG. 5, patches 501-504 are 17×17 pixels for the sake of clarity of presentation, however any size and shape of patches such as 35×35 pixels, 36×36 pixels, 32×32 pixels, 64×64 pixels, or the like may be used.

Also as shown, patches 501-504 may be transformed (as shown via arrow 505) to generate sets of transform coefficients 511-514. In the example of FIG. 5 a set of transform coefficients may be generated for each patch, however only sets of transform coefficients 511-514 are presented and labeled for the sake of clarity of presentation. For example, patches 501-504 may include N patches each having a size of M×M pixels. Each patch may be transformed to provide M×M×N DCT coefficients (e.g., N sets of M×M transform coefficients). Such a transform may be performed using any suitable technique or techniques. For example, the transform may be a DCT or the like. Sets of transform coefficients 511-514 may include multiple transform coefficients such that each transform coefficient represents or is associated with a particular frequency in the DCT domain. For example, position 521 may be associated with a particular frequency in the DCT domain and position 522 may be associated with another frequency in the DCT domain. For example, each location or position in an M×M set of transform coefficients may represent a specific frequency.

Returning to FIG. 4, processing may continue at operation 403, "Generate Histograms for Positions within the Sets of Transform Coefficients", where histograms may be generated for individual positions of the sets of transform coefficients. For example, with reference to FIG. 5, a histogram may be generated for position 521 based on the transform coefficients at position 521 within sets of transform coefficients 511-514 (e.g., the histogram for position 521 may be based on the transform coefficient values at position 521 within sets of transform coefficients 511-514). Similarly, a histogram may be generated for position 522 based on all of the transform coefficients at position 522 within each of sets of transform coefficients 511-514. Using such techniques multiple histograms may be generated such that each is associated with a position within sets of transform coefficients 511-514. In some examples, histogram generation may be skipped for one or more positions of sets of transform coefficients 511-514. For example, histogram generation may be skipped for position 531 (e.g., the DC position) of sets of transform coefficients 511-514.

Returning to FIG. 4, processing may continue at operation 404, "Fit Probability Distributions to the Histograms to Generate Probability Distribution Parameters", where probability distributions may be fitted to the histograms generated at operation 402. Such probability distributions may be fitted using any suitable technique or techniques. Furthermore, any suitable probability distributions may be fitted. In some examples, generalized Gaussian distributions may be fitted to the histograms to generate GDD parameters.

Figure 6:
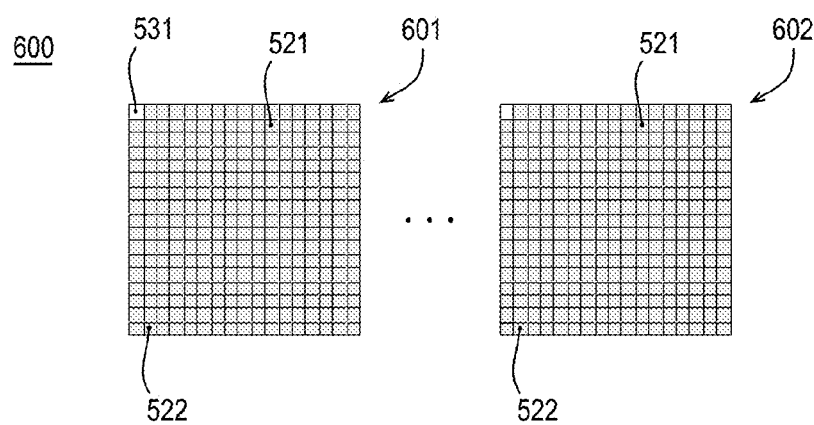
FIG. 6 illustrates example sets of probability distribution parameters.

FIG. 6 illustrates example sets of probability distribution parameters 600, arranged in accordance with at least some implementations of the present disclosure. As shown in FIG. 6, a probability distribution fitted to a histogram at a particular location such as position 521 or position 522 or the like may include multiple parameters and may generate multiple sets of probability distribution parameters 601-602. For example, in the context of GDD parameters, such sets of probability distribution parameters 601-602 may include a set of GDD shape parameters (e.g., a shape parameter for each of the discussed locations including position 521 and position 522), a set of GDD variances, a set of GDD means of absolute values, a set of GDD standard deviations, or the like. Sets of probability distribution parameters 601-602 may include any number of sets of parameters. In some examples, sets of probability distribution parameters 601-602 may include two, three, four or more sets of parameters. In some examples, no probability distribution parameters may be generated for position 531. For example, for each probability distribution parameter, an M×M−1 set of parameters may be generated.

Returning to FIG. 4, processing may continue at operation 405, "Partition Probability Distribution Parameters based on Orientation and/or Frequency Bands", where one or more of the sets of probability distribution parameters may be partitioned based on orientation and/or frequency bands. As discussed with respect to FIG. 5, patches 501-504 of valid image 113 may be transformed to generate sets of transform coefficients 511-514. Sets of transform coefficients 511-514

(and associated sets of probability distribution parameters) may be partitioned based on frequency and/or orientation to generate frequency bands and/or orientation bands of transform coefficients.

Figure 7A:
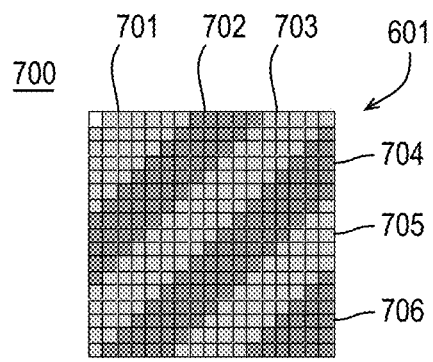
FIG. 7A illustrates an example partitioning into example frequency bands.

FIG. 7A illustrates an example partitioning 700 into example frequency bands, arranged in accordance with at least some implementations of the present disclosure. As shown in FIG. 7A, set of probability distribution parameters 601 (or any other set of probability distribution parameters) may be partitioned into frequency bands 701-706. For example, discrete cosine transform coefficients as discussed herein may be of increasing frequency moving from the top left corner to the bottom right corner of a set of transform coefficients. In the illustrated example, sets of probability distribution parameters 601 are partitioned into six frequency bands of approximately the same width, however, any suitable number of bands of any suitable widths (either approximately the same in width or having different widths) may be used. In some examples, sets of probability distribution parameters 601 may be partitioned into two, three, four, five, or more frequency bands of the same or different widths.

Figure 7B:
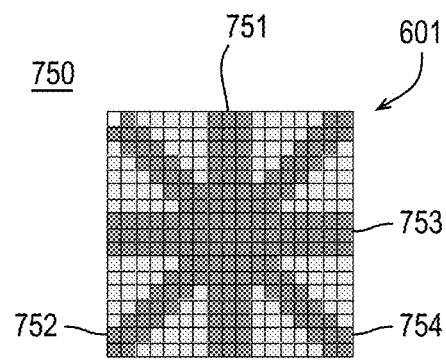
FIG. 7B illustrates an example partitioning into example orientation bands.

FIG. 7B illustrates an example partitioning 750 into example orientation bands, arranged in accordance with at least some implementations of the present disclosure. As shown in FIG. 7B, set of probability distribution parameters 601 (or any other set of probability distribution parameters) may be partitioned into orientation bands 751-754. For example, orientation band 751 may be a centered vertical band, orientation band 752 may be a centered diagonal band extending from a lower left corner to an upper right corner, orientation band 753 may be a centered horizontal band, and orientation band 754 may be a centered diagonal band extending from an upper left corner to a lower right corner. Although illustrated with four orientation bands having the described characteristics, any number of orientation bands with any sizes or characteristics (e.g., not centered, having diagonal but non-45 degree angles or the like) may be used.

As discussed, one or more sets of probability distribution parameters may be partitioned into frequency and/or orientation bands. FIGS. 7A and 7B illustrate the partitioning of one set of probability distribution parameters for the sake of clarity of presentation. However, one, some, or all of the sets of probability distribution parameters (e.g., as discussed with respect to FIG. 6) may be partitioned using the same patterns or different patterns. As discussed, each band (e.g., frequency band or orientation band) may include the particular probability distribution parameters associated with the band. For example, if a band has P locations, there may be P probability distribution parameters in the band. As discussed, multiple sets of probability distribution parameters may be generated and one, some or all of such sets of probability distribution parameters may be partitioned into frequency and/or orientation bands. In some examples, such sets of sets of probability distribution parameters may be partitioned into the same size and shape of frequency and/or orientation bands. In other examples, they may partitioned into frequency and/or orientation bands having different sizes or shapes.

Returning to FIG. 4, processing may continue at operation 406, "Generate Features based on Partitioned Probability Distribution Parameters", where natural scene statistics based features may be generated based on the partitioned probability distribution parameters. The natural scene statistics based features may include any suitable features generated using any suitable technique or techniques. For example, statistical combinations of the partitioned probability distribution parameters (e.g., a mean of each parameter per orientation and frequency band, ratios among the means, and so on) may be generated as natural scene statistics based features. Such natural scene statistics based features may be provided, as discussed further herein, to a machine learning operator or the like to provide an image evaluation indicator.

In some examples, the natural scene statistics based features may include a mean of a probability distribution parameter for one or more of the frequency bands and/or one or more of the orientation bands. In some examples, the natural scene statistics based features may include a mean value for each probability distribution parameter and each of the frequency and orientating bands. In some examples, the natural scene statistics based features may include one or some of such mean values. In the context of generalized Gaussian distribution probability distribution parameters, the features may include one or more of means of GDD shape parameters for one or more of the frequency bands and/or orientation bands, means of GDD variances or one or more of the frequency bands and/or orientation bands, means of GDD means of absolute values or one or more of the frequency bands and/or orientation bands, means of GDD standard deviations, or the like.

As discussed, in some examples, the natural scene statistics based features may include mean values of the banded probability distribution parameters. In addition or in the alternative, the natural scene statistics based features may include a maximum or minimum probability distribution parameter value of the one or more of the frequency bands and/or orientation bands, ranges of probability distribution parameter values (e.g., a difference between a maximum and minimum value) of the one or more of the frequency bands and/or orientation bands, or the like. As discussed, such frequency band and/or orientation band values may be generated for one, some, or all of the partitioned probability distribution parameters.

Furthermore, the natural scene statistics based features may include features that are not based on frequency bands and/or orientation bands. For example, such features may be based on an entirety of a set of probability distribution parameters. Such set based natural scene statistics based features may include means of the probability distribution parameters, minimums of the probability distribution parameters, maximums of the probability distribution parameters, ranges of the probability distribution parameters, or the like.

In some examples, such band based natural scene statistics based features or values (e.g., means, maximums, minimums, ranges, etc. for particular bands) and/or such set based natural scene statistics based features or values may be combined (e.g., combined in statistically meaningful ways) to generate additional natural scene statistics based features. Such combinations may include ratios of band based values, weighted averages of band based values, or the like. For example, with reference to FIGS. 7A and 7B a natural scene statistics based feature may include a ratio of the mean of the probability distribution parameter of frequency band 701 to the mean of the probability distribution parameter of frequency band 702, 703, 704, 705, or 706 or to the mean of the probability distribution parameter of orientation band 751, 752, 753, or 754. For example, natural scene statistics based features may include any ratio among means of probability distribution parameters among frequency bands and/or among orientation bands and/or among other characteristics (e.g., maximums, minimums, ranges, etc.). For example, such statistics may be characterized as intra-probability distribution parameter statistics.

In some examples, inter-probability distribution parameter statistics may be generated that use different types of probability distribution parameters. For example, a natural scene statistics based feature may include a ratio of the mean of the probability distribution parameter of frequency band 701 (e.g., of set of probability distribution parameters 601) to the mean of a different probability distribution parameter across the same shape frequency band (e.g., frequency band 701 applied to set of probability distribution parameters 602 or the like). Such operations may be provided to means, maximums, minimums, ranges or the like and between any sets of probability distribution parameters 601 and/or frequency bands and/or orientation bands. For example, natural scene statistics based features may include any combination of values generated based on frequency bands and/or orientation bands within sets of probability distribution parameters or across types of probability distribution parameters. Furthermore, the frequency bands and/or orientation bands may have the same or different sizes and shapes across the sets of probability distribution parameters.

As discussed with respect to operation 405, sets of probability distribution parameters may be partitioned based on orientation and/or frequency bands. Such partitioning may be modular and may provide for the decomposition of an image along any number of frequency or orientation bands and for the generation of any suitable natural scene statistics based features. For example, at operation 406, the generation of natural scene statistics based features may leverage such partitioned sets of probability distribution parameters to generate a range of natural scene statistics based features that may be varied or selected to provide features for the generation of an image quality evaluation for an image.

Also as discussed, patches of an image may be transformed to a frequency domain. For example, the transform may be a discrete cosine transform or the like. For locations within the sets of resultant transform coefficients (e.g., with locations being associated with frequencies of the transform), histograms may be generated and the histograms may be fitted with a probability distributions such as generalized Gaussian distributions to provide probability distribution parameters associated with the locations (e.g., such that each location has one or more probability distribution parameters). The probability distribution parameters may be partitioned into frequency and/or orientation bands. The partitioned probability distribution parameters may be used to generate natural scene statistics based features based on band averaging, ratios among bands, and the like. Such generation of natural scene statistics based features may provide indications of low level image signatures that change with perceived image quality. For example, natural scene statistics based features may capture local orientation information, inter-pixel interaction, and local sub-band interaction in an image. Such low level signatures may change, for example, as an image shifts from pristine to distorted.

Returning to FIG. 1, as discussed, image analysis module 106 may generate image evaluation indicator 114. Image evaluation indicator 114 may include any suitable image evaluation indicator such as an image score (e.g., a value ranging from 1 to 5 or 1 to 10 or the like) or a subjective label (e.g., poor, good, excellent, etc.) or the like. Furthermore, image evaluation indicator 114 may be presented to a user via display 102 or the like. For example, image evaluation indicator 114 may provide a consumer friendly rating representing a quality of an image.

Also, as shown, image evaluation indicator 114 may be provided to camera analysis module 109. Camera analysis module 109 may receive image evaluation indicator 114 and additional image evaluation indicators for the same camera used to generate valid image 113 (e.g., camera 101 or a remote camera) and camera analysis module 109 may generate camera evaluation indicator 115 based on the image evaluation indicators. Camera evaluation indicator 115 may be generated using any suitable technique or techniques. For example, camera evaluation indicator 115 may be a mean of the image evaluation indicators for the camera. In some examples, camera evaluation indicator 115 may be based on image evaluation indicators that are associated with each of multiple image categories. Such image categories may include, for example, a landscape, indoor arrangement, indoor flat surface, outdoor night, selfie categories, or the like. In some example, camera evaluation indicator 115 may require at least one valid image from each or some of such categories. In some examples, camera evaluation indicator 115 may be provided with images missing from some of such categories, but a user may be notified the categories have not been completed.

Camera evaluation indicator 115 may include any suitable indicator of camera quality such as a score (e.g., from 1 to 5 or 1 to 10 or the like), a subjective label, or the like. In some examples, camera evaluation indicator 115 may provide an overall mean opinion score (MOS) of the camera based on the predicted MOS of the individual images in the test photo set (e.g., valid images 113). For example, based on the statistically valid real world test photo framework provided via test image validation module 103 (and image capture indicators 112, if applicable), the image quality evaluation provided via image analysis module 106 may provide reliable metrics for camera evaluation.

Furthermore, one or more image evaluation indicators may be used to provide a video evaluation indicator. Such a video evaluation indicator may be generated via image analysis module 106, for example, and may be based on a single video frame (e.g., such that the video evaluation indicator is the same as the generated image evaluation indicator) or multiple video frames from the same video sequence or different video sequences. In such multiple video frame examples, the associated video evaluation indicator may be generated based on a mean of the multiple image evaluation indicators associated with the multiple video frames or the like.

As discussed herein, features including natural scene statistics based features and image quality based features may be generated and mapped to an image evaluation indicator via an image analysis module 106.

Figure 8:
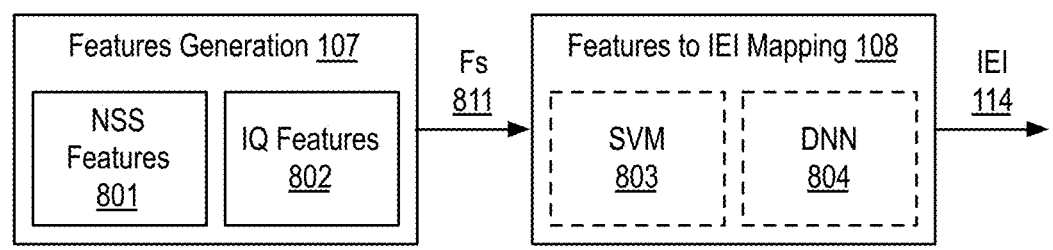
FIG. 8 illustrates an example image analysis module.

FIG. 8 illustrates an example image analysis module 106, arranged in accordance with at least some implementations of the present disclosure. As discussed with respect to FIG. 1, image analysis module 106 may include features generation module 107 and features to image evaluation indicator mapping module 108. As shown in FIG. 8, features generation module 107 may include a natural scene statistics (NSS) features module 801 and an image quality features module 802 and features generation module 107 may generate features (Fs) 811. For example, natural scene statistics features module 801 may generate natural scene statistics based features as discussed herein such as with respect to process 400 and image quality features module 802 may generate image quality based features as discussed herein such as with respect to operation 303. Features generation module 107 may provide such natural scene statistics based features and image quality based features as features 811 to image evaluation indicator mapping module 108.

Features to image evaluation indicator mapping module 108 may receive features 811 and provide image evaluation indicator 114. For example, features 811 may be mapped to image evaluation indicator 114 using any suitable technique or techniques such as those discussed herein. For example, feature to image evaluation indicator mapping module 108 may provide a support vector machine 803 or a deep neural network 804 to map features 811 to image evaluation indicator 114. As discussed, in some example, image analysis module 106 may be provided separately from the camera used to generate a valid image and/or the display used to present results to a user. For example, the camera and display may be provided via a mobile device and image analysis module 106 may be provided via a separate personal computer system or a cloud computing system or the like. In some examples, features generation module 107 may be provided via the mobile device and features to image evaluation indicator mapping module 108 may be provided via a separate personal computer system or a cloud computing system or the like.

For example, support vector machine 803 or deep neural network 804 may be pretrained based on a set of training images or the like. In some examples, prior to training the machine learning operator on subjective data to learn a mapping from features to image evaluation or quality scores, the features may be subjected to a logarithmic nonlinearity log(1+features) to model the human vision system's non-linear response to increasing stimuli to improve prediction accuracy.

In some examples, as valid images are obtained and uploaded for analysis (e.g., via a cloud computing system), such valid images may be used to continue to dynamically train support vector machine 803 or deep neural network 804. Such dynamic training may be provided at a fixed interval (e.g., every quarter or every 10 days or the like) and/or such training may be crowd-sourced (e.g., valid images may be provided to a user group to provide a quality rating, which may be used to train support vector machine 803 or deep neural network 804). For example, such dynamic training may provide a dynamically trained mapping via support vector machine 803 or deep neural network 804. As more valid images are added to the training set and used to train support vector machine 803 or deep neural network 804, support vector machine 803 or deep neural network 804 may become better trained and more sophisticated. In some embodiments, user feedback may be solicited and such feedback may be incorporated into the training of support vector machine 803 or deep neural network 804. For example, a user may be provided image evaluation indicator 114 and an opportunity to personally rate or evaluate the image (e.g., via a user interface provided via display 102) to provide a user score or the like. Such user scores may be used to train support vector machine 803 or deep neural network 804 to provide a personal or customized image quality preference for the user of the device.

In some examples, features to image evaluation indicator mapping module 108 may be implemented with support vector machine 803 and as additional valid images are added to the training set, deep neural network 804 may be trained and features to image evaluation indicator mapping module 108 may implement deep neural network 804, which may provide a more sophisticated mapping of features 811 to image evaluation indicator 114. For example, features to image evaluation indicator mapping module 108 may change machine learning operators based on the training image set available to train the machine learning operator. In some embodiments, features to image evaluation indicator mapping module 108 may shift to a more complex machine learning operator when enough data volume for training the more complex machine learning operator is available.

As discussed, techniques may be provided to generate image evaluation indicators or scores, video evaluation indicators or scores, and/or camera evaluation indicators or scores. In some examples, such techniques may be leveraged to provide decision making for a user. For example, with reference to FIG. 1, in some contexts, a user may actuate camera 101 with a single capture indicator (e.g., button depression or the like) and camera 101 may capture multiple images such as 3 or more images. In such contexts, image analysis module 106 may generate an image evaluation indicator for each of the captured image and a highest scoring image may be retained and the others may be discarded. Furthermore, in some contexts, a set of images (e.g., a database of images) may be provided to image analysis module 106 and image analysis module 106 may generate an image evaluation indicator for each of the images. In such contexts, the image evaluation indicator or score may be used to organize the images by scores (or ranges of scores), to discard images below a quality threshold, to present images above a quality threshold or the like. Such techniques may provide for rapid and high quality image sorting or the like.

Figure 9:
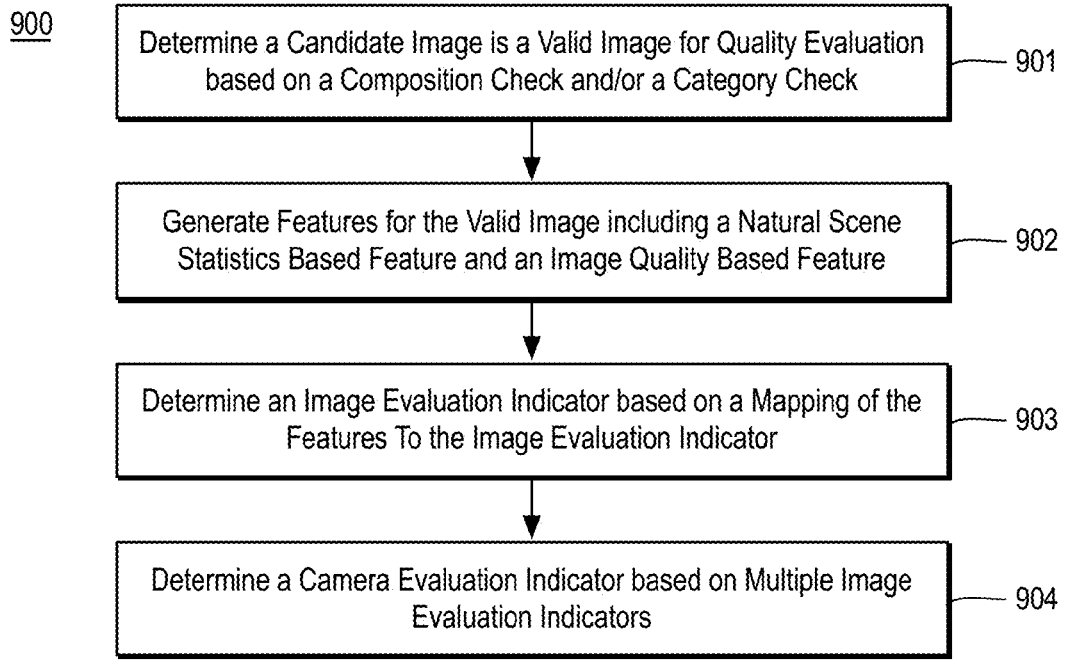
FIG. 9 is a flow diagram illustrating an example process for performing no-reference image, video, or camera evaluation.

FIG. 9 is a flow diagram illustrating an example process 900 for performing no-reference image, video, or camera evaluation, arranged in accordance with at least some implementations of the present disclosure. Process 900 may include one or more operations 901-904 as illustrated in FIG. 9. Process 900 may form at least part of a no-reference image, video, or camera evaluation process. By way of non-limiting example, process 900 may form at least part of a no-reference image, video, or camera evaluation process as performed by device 100 as discussed herein. Furthermore, process 900 will be described herein with reference to system 1000 of FIG. 10.

Figure 10:
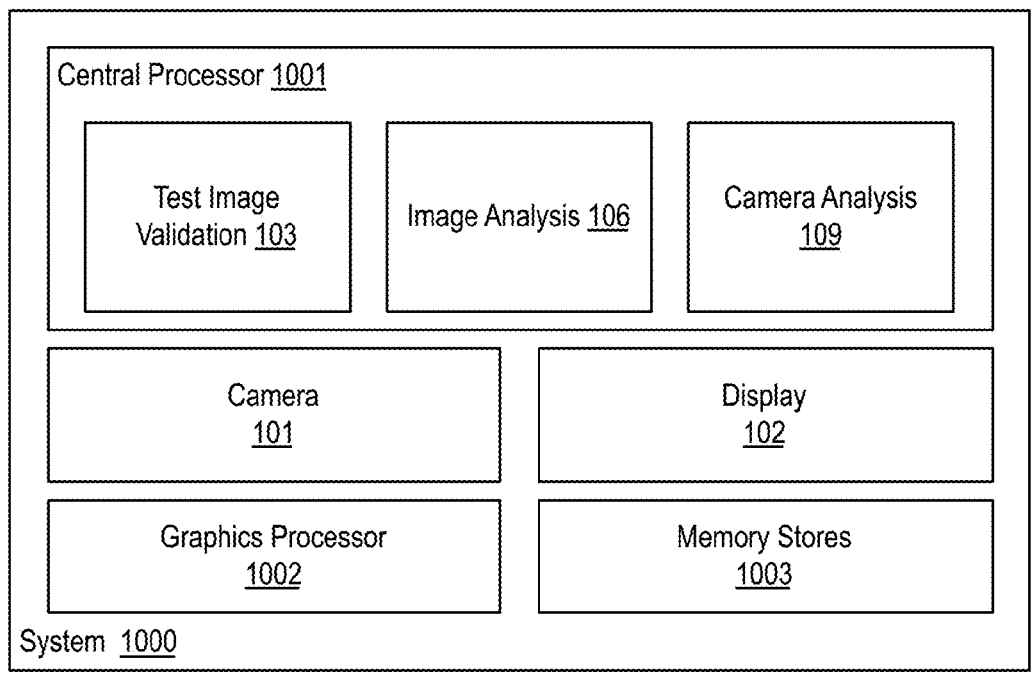
FIG. 10 is an illustrative diagram of an example system for performing no-reference image, video, or camera evaluation.

FIG. 10 is an illustrative diagram of an example system 1000 for performing no-reference image, video, or camera evaluation, arranged in accordance with at least some implementations of the present disclosure. As shown in FIG. 10, system 1000 may include a central processor 1001, a graphics processor 1002, memory stores 1003, camera 101, and display 102. As discussed, in some embodiments system 1000 may not include camera 101 and/or display 102. Also as shown, central processor 1001 may include test image validation module 103, image analysis module 106, and camera analysis module 109. In the example of system 1000, memory stores 1003 may store image data such as candidate images or valid images or related content such as image capture indicators, image evaluation indicators, camera evaluation indicators, features, thresholds, or the like.

As shown, in some examples, test image validation module 103, image analysis module 106, and camera analysis module 109 may be implemented via central processor 1001. In other examples, one or more or portions of test image validation module 103, image analysis module 106, and camera analysis module 109 may be implemented via graphics processor 1002, an image processing unit, an image processing pipeline, or the like. In some examples, test image validation module 103, image analysis module 106, and camera analysis module 109 may be implemented in hardware as a system-on-a-chip (SoC).

Graphics processor 1002 may include any number and type of graphics processing units that may provide the operations as discussed herein. Such operations may be implemented via software or hardware or a combination thereof. For example, graphics processor 1002 may include circuitry dedicated to manipulate and/or analyze images obtained from memory stores 1003. Central processor 1001 may include any number and type of processing units or modules that may provide control and other high level functions for system 1000 and/or provide any operations as discussed herein. Memory stores 1003 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1003 may be implemented by cache memory. In an embodiment, one or more or portions of test image validation module 103, image analysis module 106, and camera analysis module 109 may be implemented via an execution unit (EU) of graphics processor 1002. The EU may include, for example, programmable logic or circuitry such as a logic core or cores that may provide a wide array of programmable logic functions. In an embodiment, one or more or portions of test image validation module 103, image analysis module 106, and camera analysis module 109 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 9, process 900 may begin at operation 901, "Determine a Candidate Image is a Valid Image for Quality Evaluation based on a Composition Check and/or a Category Check", where a candidate image may be determined to be a valid image for quality evaluation based at least in part on a composition check of the candidate image or a category check of the candidate image. For example, test image validation module 103 as implemented via central processor 1001 may determine the candidate image is a valid image for quality evaluation. The candidate image may be any suitable image such as a still image or a video frame.

In some examples, determining the candidate image is a valid image may include determining a probability the candidate image is associated with a predetermined target category based on natural scene statistics associated with the candidate image and performing the category check by comparing the probability to a threshold. For example, the predetermined target category may be a landscape category, an indoor arrangement category, an indoor flat surface category, an outdoor night capture category, or the like. In some examples, determining the candidate image is a valid image may include applying a flat region detector to the candidate image to determine a percentage of the candidate image including flat regions and performing the composition check by comparing the percentage to a threshold.

In some examples, prior to, during, or subsequent to determining the candidate image is a valid image, a user may be presented (e.g., via display 102), image capture indicators for capturing the candidate image. For example, the image capture indicators may include a scene composition indicator, an illumination indicator, an example image, or the like.

Processing may continue at operation 902, "Generate Features for the Valid Image including a Natural Scene Statistics Based Feature and an Image Quality Based Feature", where features including one or more natural scene statistics based features and one or more image quality based features may be generated. Such features may be generated using any suitable technique or techniques. For example, image analysis module 106 as implemented via central processor 1001 may generate the features. In some examples, image quality based feature may be a sharpness, a noise, a dynamic range, or an illumination of the valid image.

In some examples, generating the features may include transforming patches of the valid image to generate sets of transform coefficients, fitting a probability distribution to each of multiple histograms such that each of the histograms is associated with a position within the sets of transform coefficients to generate probability distribution parameters, partitioning the probability distribution parameters based on orientation bands and frequency bands associated with the sets of transform coefficients, and generating first feature based on probability distribution parameters from a band of the orientation bands and frequency bands. In some examples, the sets of transform coefficients may be discrete cosine transform (DCT) coefficients, the probability distribution may be a generalized Gaussian distribution (GDD), and/or the feature may be a mean of the probability distribution parameters from the band. In some examples, generating the features may further include generating another feature as a ratio of a mean of the probability distribution parameters from the band and a mean of probability distribution parameters from another band of the orientation bands and frequency bands. In some examples, the probability distribution comprises a generalized Gaussian distributions (GDD) and the plurality of probability distribution parameters may include GDD shape parameters, GDD variances, GDD means of absolute values, and/or GDD standard deviations.

Processing may continue at operation 903, "Determine an Image Evaluation Indicator based on a Mapping of the Features To the Image Evaluation Indicator", where an image evaluation indicator associated with the valid image may be determined based on a mapping of the generated features to the image evaluation indicator. The mapping may be performed using any suitable technique or techniques. For example, image analysis module 106 as implemented via central processor 1001 may perform the mapping. In some examples, the mapping may be performed via a support vector machine, a neural network, a deep neural network, or the like. In some examples, the mapping may be a dynamically trained mapping or a dynamic mapping strategy or the like such that the mapping is dynamically trained based on crowd-sourced feedback or personal user feedback or the like. The image evaluation indicator may be any suitable indicator or score or the like.

Processing may continue at operation 904, "Determine a Camera Evaluation Indicator based on Multiple Image Evaluation Indicators", where a camera evaluation indicator associated with a camera used to capture the valid image may be determined based on multiple image evaluation indicators including the image evaluation indicator. The camera evaluation indicator may be any suitable indicator or score or the like. In some examples, a portion of the plurality of image evaluation indicators may include image evaluation indicators that are each associated with an image category of a plurality of image categories.

Process 900 may be repeated any number of times either in series or in parallel for any number of images or the like. As discussed, process 900 may provide for no-reference image, video, or camera evaluation.

Various components of the systems described herein may be implemented in software, firmware, and/or hardware and/or any combination thereof. For example, various components of device 100, system 1000, system 1100, or device 1200 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or demultiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of device 100, system 1000, system 1100, or device 1200, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
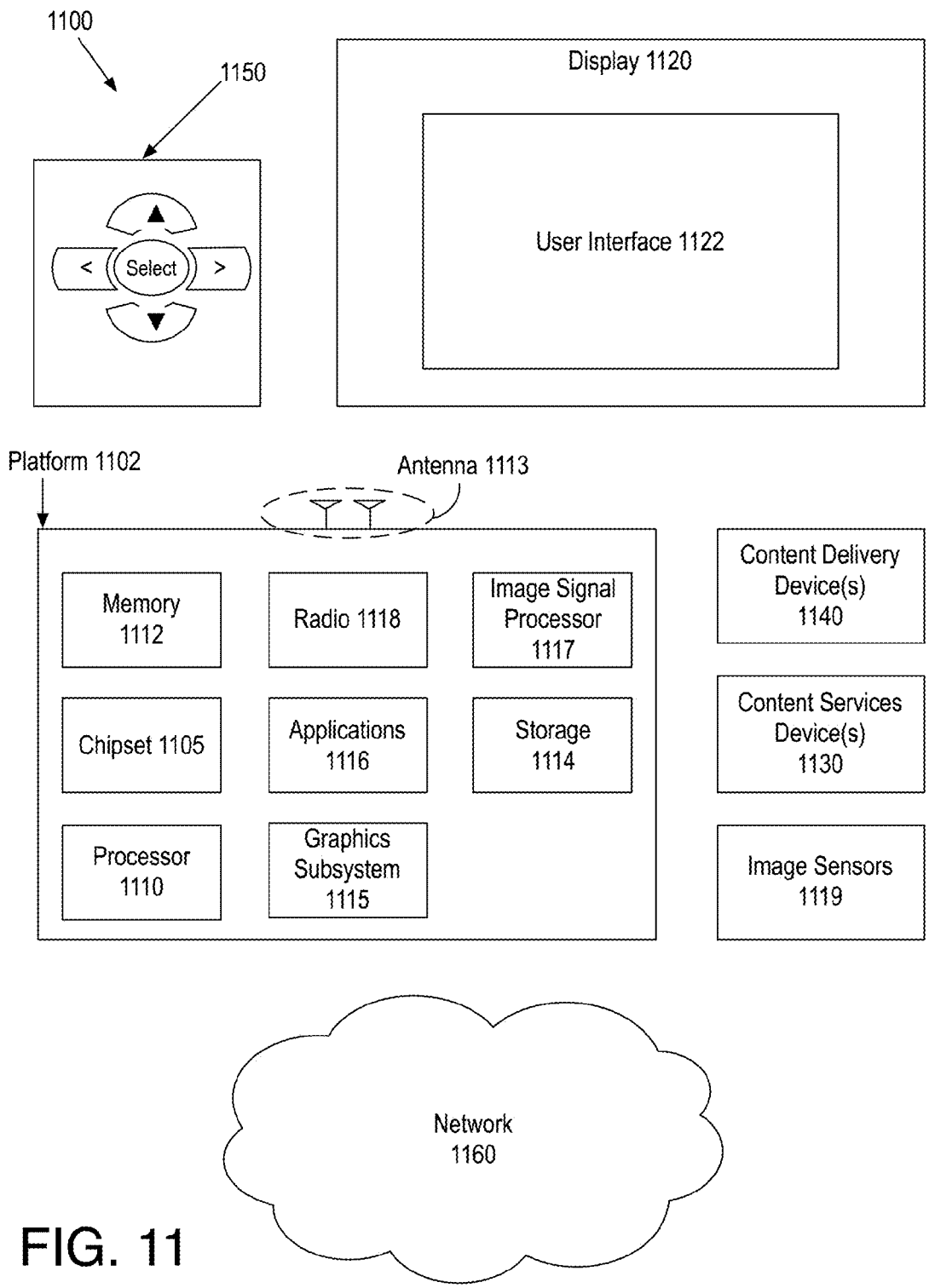
FIG. 11 is an illustrative diagram of an example system.

FIG. 11 is an illustrative diagram of an example system 1100, arranged in accordance with at least some implementations of the present disclosure. In various implementations, system 1100 may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1100 includes a platform 1102 coupled to a display 1120. Platform 1102 may receive content from a content device such as content services device(s) 1130 or content delivery device(s) 1140 or other content sources such as image sensors 1119. For example, platform 1102 may receive stereo image data as discussed herein from image sensors 1119 or any other content source. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1116, image signal processor 1117 and/or radio 1118. Chipset 1105 may provide intercommunication among processor 1110, memory 1112, storage 1114, graphics subsystem 1115, applications 1116, image signal processor 1117 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Image signal processor 1117 may be implemented as a specialized digital signal processor or the like used for image processing. In some examples, image signal processor 1117 may be implemented based on a single instruction multiple data or multiple instruction multiple data architecture or the like. In some examples, image signal processor 1117 may be characterized as a media processor. As discussed herein, image signal processor 1117 may be implemented based on a system on a chip architecture and/or based on a multi-core architecture.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

Image sensors 1119 may include any suitable image sensors that may provide stereo image data based on a scene. For example, image sensors 1119 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1119 may include any device that may detect information of a scene to generate stereo image data. In some examples, system 1100 may include multiple image sensors 1119, which may be the same or different. In some examples, image sensors 1119 may provide image capture processing or logic associated with image sensors 1119 (not shown) such as stereo image calibration or rectification. In other examples, such image capture processing may be performed via platform 602.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/display 1120, via network 1160 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of navigation controller 1150 may be used to interact with user interface 1122, for example. In various embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In various embodiments, navigation controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth.

When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
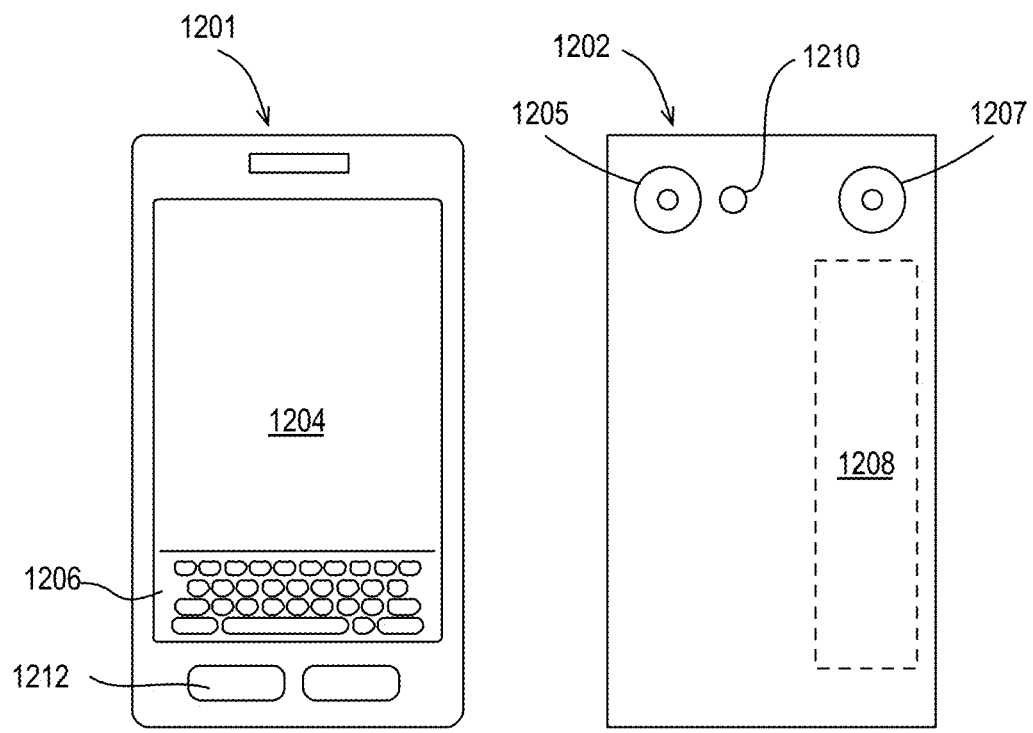
FIG. 12 illustrates an example small form factor device, all arranged in accordance with at least some implementations of the present disclosure.

As described above, system 1100 may be embodied in varying physical styles or form factors. FIG. 12 illustrates an example small form factor device 1200, arranged in accordance with at least some implementations of the present disclosure. In some examples, system 1100 may be implemented via device 1200. In other examples, device 100 or portions thereof may be implemented via device 1200. In various embodiments, for example, device 1200 may be implemented as a mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may include a housing with a front 1201 and a back 1202. Device 1200 includes a display 1204, an input/output (I/O) device 1206, and an integrated antenna 1208. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone (not shown), or may be digitized by a voice recognition device. As shown, device 1200 may include a camera 1205 (e.g., including a lens, an aperture, and an imaging sensor), a camera 1207 (e.g., including a lens, an aperture, and an imaging sensor), and a flash 1210 integrated into back 1202 (or elsewhere) of device 1200. In other examples, cameras 1205, 1207, and flash 1210 may be integrated into front 1201 of device 1200 and/or additional cameras (e.g., such that device 1200 has front and back cameras) may be provided. Cameras 1205, 1207 may be components of a stereo camera module to originate stereo image data and/or stereo video data that may be output to display 1204 and/or communicated remotely from device 1200 via antenna 1208 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a method for performing no-reference image or video evaluation comprises determining a candidate image is a valid image for quality evaluation based at least in part on a composition check of the candidate image or a category check of the candidate image, generating features associated with the valid image, wherein the features comprise at least one natural scene statistics based feature and at least one image quality based feature, and determining an image evaluation indicator associated with the valid image based on a mapping of the generated features to the image evaluation indicator.

Further to the first embodiments, determining the candidate image is a valid image comprises determining a probability the candidate image is associated with a predetermined target category based on natural scene statistics associated with the candidate image and performing the category check by comparing the probability to a threshold.

Further to the first embodiments, determining the candidate image is a valid image comprises determining a probability the candidate image is associated with a predetermined target category based on natural scene statistics associated with the candidate image and performing the category check by comparing the probability to a threshold, wherein the predetermined target category comprises at least one of a landscape category, an indoor arrangement category, an indoor flat surface category, or an outdoor night capture category.

Further to the first embodiments, determining the candidate image is a valid image comprises applying a flat region detector to the candidate image to determine a percentage of the candidate image including flat regions and performing the composition check by comparing the percentage to a threshold.

Further to the first embodiments, the method further comprises presenting, to a user via a display, one or more image capture indicators for capturing the candidate image, wherein the image capture indicators comprise at least one of a scene composition indicator, an illumination indicator, or an example image.

Further to the first embodiments, the method further comprises determining a camera evaluation indicator associated with a camera used to capture the valid image based on a plurality of image evaluation indicators comprising the image evaluation indicator.

Further to the first embodiments, the method further comprises determining a camera evaluation indicator associated with a camera used to capture the valid image based on a plurality of image evaluation indicators comprising the image evaluation indicator, wherein a portion of the plurality of image evaluation indicators comprises image evaluation indicators that are each associated with an image category of a plurality of image categories.

Further to the first embodiments, the method further comprises transforming patches of the valid image to generate a plurality of sets of transform coefficients, fitting a probability distribution to each of a plurality of histograms, wherein each of the plurality of histograms is associated with a position within the sets of transform coefficients, to generate a plurality of probability distribution parameters, partitioning the probability distribution parameters based on orientation bands and frequency bands associated with the sets of transform coefficients, and generating at least a first feature based on probability distribution parameters from a first band of the orientation bands and frequency bands.

Further to the first embodiments, the method further comprises transforming patches of the valid image to generate a plurality of sets of transform coefficients, fitting a probability distribution to each of a plurality of histograms, wherein each of the plurality of histograms is associated with a position within the sets of transform coefficients, to generate a plurality of probability distribution parameters, partitioning the probability distribution parameters based on orientation bands and frequency bands associated with the sets of transform coefficients, and generating at least a first feature based on probability distribution parameters from a first band of the orientation bands and frequency bands, wherein the sets of transform coefficients comprise discrete cosine transform (DCT) coefficients, the probability distribution comprises a generalized Gaussian distribution (GDD), and the first feature comprises a mean of the probability distribution parameters from the first band.

Further to the first embodiments, the method further comprises transforming patches of the valid image to generate a plurality of sets of transform coefficients, fitting a probability distribution to each of a plurality of histograms, wherein each of the plurality of histograms is associated with a position within the sets of transform coefficients, to generate a plurality of probability distribution parameters, partitioning the probability distribution parameters based on orientation bands and frequency bands associated with the sets of transform coefficients, generating at least a first feature based on probability distribution parameters from a first band of the orientation bands and frequency bands, and generating a second feature as a ratio of a mean of the probability distribution parameters from the first band and a mean of probability distribution parameters from a second band of the orientation bands and frequency bands.

Further to the first embodiments, the method further comprises transforming patches of the valid image to generate a plurality of sets of transform coefficients, fitting a probability distribution to each of a plurality of histograms, wherein each of the plurality of histograms is associated with a position within the sets of transform coefficients, to generate a plurality of probability distribution parameters, partitioning the probability distribution parameters based on orientation bands and frequency bands associated with the sets of transform coefficients, and generating at least a first feature based on probability distribution parameters from a first band of the orientation bands and frequency bands, wherein the probability distribution comprises a generalized Gaussian distributions (GDD) and the plurality of probability distribution parameters comprise GDD shape parameters, GDD variances, GDD means of absolute values, and GDD standard deviations.

Further to the first embodiments, the image quality based feature comprises at least one of a sharpness, a noise, a dynamic range, or an illumination of the valid image.

Further to the first embodiments, the candidate image comprises at least one of a still image or a video frame and the mapping comprises a dynamically trained mapping.

In one or more second embodiments, a system for performing no-reference image or video evaluation comprises a memory configured to receive a valid image for quality evaluation and a central processor coupled to the memory, the central processor to determine a candidate image is a valid image for quality evaluation based at least in part on a composition check of the candidate image or a category check of the candidate image, to generate features associated with the valid image, wherein the features comprise at least one natural scene statistics based feature and at least one image quality based feature, and to determine an image evaluation indicator associated with the valid image based on a mapping of the generated features to the image evaluation indicator.

Further to the second embodiments, the central processor to determine the candidate image is a valid image comprises the central processor to determine a probability the candidate image is associated with a predetermined target category based on natural scene statistics associated with the candidate image and to perform the category check by comparing the probability to a threshold.

Further to the second embodiments, the central processor to determine the candidate image is a valid image comprises the central processor to determine a probability the candidate image is associated with a predetermined target category based on natural scene statistics associated with the candidate image and to perform the category check by comparing the probability to a threshold, wherein the predetermined target category comprises at least one of a landscape category, an indoor arrangement category, an indoor flat surface category, or an outdoor night capture category.

Further to the second embodiments, the central processor to determine the candidate image is a valid image comprises the central processor to apply a flat region detector to the candidate image to determine a percentage of the candidate image including flat regions and to perform the composition check by comparing the percentage to a threshold.

Further to the second embodiments, the central processor to determine the candidate image is a valid image comprises the central processor to determine a probability the candidate image is associated with a predetermined target category based on natural scene statistics associated with the candidate image, perform the category check by comparing the probability to a threshold, apply a flat region detector to the candidate image to determine a percentage of the candidate image including flat regions, and perform the composition check by comparing the percentage to a second threshold.

Further to the second embodiments, the central processor is further to determine a camera evaluation indicator associated with a camera used to capture the valid image based on a plurality of image evaluation indicators comprising the image evaluation indicator.

Further to the second embodiments, the central processor is further to determine a camera evaluation indicator associated with a camera used to capture the valid image based on a plurality of image evaluation indicators comprising the image evaluation indicator, wherein a portion of the plurality of image evaluation indicators comprises image evaluation indicators that are each associated with an image category of a plurality of image categories.

Further to the second embodiments, the central processor to generate features comprises the central processor to transform patches of the valid image to generate a plurality of sets of transform coefficients, to fit a probability distribution to each of a plurality of histograms, wherein each of the plurality of histograms is associated with a position within the sets of transform coefficients, to generate a plurality of probability distribution parameters, to partition the probability distribution parameters based on orientation bands and frequency bands associated with the sets of transform coefficients, and to generate at least a first feature based on probability distribution parameters from a first band of the orientation bands and frequency bands.

Further to the second embodiments, the central processor to generate features comprises the central processor to transform patches of the valid image to generate a plurality of sets of transform coefficients, to fit a probability distribution to each of a plurality of histograms, wherein each of the plurality of histograms is associated with a position within the sets of transform coefficients, to generate a plurality of probability distribution parameters, to partition the probability distribution parameters based on orientation bands and frequency bands associated with the sets of transform coefficients, and to generate at least a first feature based on probability distribution parameters from a first band of the orientation bands and frequency bands, wherein the sets of transform coefficients comprise discrete cosine transform (DCT) coefficients, the probability distribution comprises a generalized Gaussian distribution (GDD), and the first feature comprises a mean of the probability distribution parameters from the first band.

Further to the second embodiments, the central processor to generate features comprises the central processor to transform patches of the valid image to generate a plurality of sets of transform coefficients, to fit a probability distribution to each of a plurality of histograms, wherein each of the plurality of histograms is associated with a position within the sets of transform coefficients, to generate a plurality of probability distribution parameters, to partition the probability distribution parameters based on orientation bands and frequency bands associated with the sets of transform coefficients, and to generate at least a first feature based on probability distribution parameters from a first band of the orientation bands and frequency bands, wherein the central processor is further to generate a second feature as a ratio of a mean of the probability distribution parameters from the first band and a mean of probability distribution parameters from a second band of the orientation bands and frequency bands.

Further to the second embodiments, the central processor to generate features comprises the central processor to transform patches of the valid image to generate a plurality of sets of transform coefficients, to fit a probability distribution to each of a plurality of histograms, wherein each of the plurality of histograms is associated with a position within the sets of transform coefficients, to generate a plurality of probability distribution parameters, to partition the probability distribution parameters based on orientation bands and frequency bands associated with the sets of transform coefficients, and to generate at least a first feature based on probability distribution parameters from a first band of the orientation bands and frequency bands, wherein the probability distribution comprises a generalized Gaussian distributions (GDD) and the plurality of probability distribution parameters comprise GDD shape parameters, GDD variances, GDD means of absolute values, and GDD standard deviations.

Further to the second embodiments, the image quality based feature comprises at least one of a sharpness, a noise, a dynamic range, or an illumination of the valid image.

Further to the second embodiments, the system further comprises a camera to capture a candidate image and a display to present one or more image capture indicators for capturing the candidate image, wherein the image capture indicators comprise at least one of a scene composition indicator, an illumination indicator, or an example image.

Further to the second embodiments, the system comprises at least one of a personal computer system or a cloud computing system.

Further to the second embodiments, the candidate image comprises at least one of a still image or a video frame and the mapping comprises a dynamically trained mapping.

In one or more third embodiments, a system for performing no-reference image or video evaluation comprises means for determining a candidate image is a valid image for quality evaluation based at least in part on a composition check of the candidate image or a category check of the candidate image, means for generating features associated with the valid image, wherein the features comprise at least one natural scene statistics based feature and at least one image quality based feature, and means for determining an image evaluation indicator associated with the valid image based on a mapping of the generated features to the image evaluation indicator.

Further to the third embodiments, the means for determining the candidate image is a valid image comprise means for determining a probability the candidate image is associated with a predetermined target category based on natural scene statistics associated with the candidate image and means for performing the category check by comparing the probability to a threshold.

Further to the third embodiments, the means for determining the candidate image is a valid image comprise means for determining a probability the candidate image is associated with a predetermined target category based on natural scene statistics associated with the candidate image and means for performing the category check by comparing the probability to a threshold, wherein the predetermined target category comprises at least one of a landscape category, an indoor arrangement category, an indoor flat surface category, or an outdoor night capture category.

Further to the third embodiments, the means for determining the candidate image is a valid image comprise means for applying a flat region detector to the candidate image to determine a percentage of the candidate image including flat regions and means for performing the composition check by comparing the percentage to a threshold.

Further to the third embodiments, the system further comprises means for presenting, to a user via a display, one or more image capture indicators for capturing the candidate image, wherein the image capture indicators comprise at least one of a scene composition indicator, an illumination indicator, or an example image.

Further to the third embodiments, the system further comprises means for determining a camera evaluation indicator associated with a camera used to capture the valid image based on a plurality of image evaluation indicators comprising the image evaluation indicator.

Further to the third embodiments, means for determining a camera evaluation indicator associated with a camera used to capture the valid image based on a plurality of image evaluation indicators comprising the image evaluation indicator, wherein a portion of the plurality of image evaluation indicators comprises image evaluation indicators that are each associated with an image category of a plurality of image categories.

Further to the third embodiments, the means for generating the features comprise means for transforming patches of the valid image to generate a plurality of sets of transform coefficients, means for fitting a probability distribution to each of a plurality of histograms, wherein each of the plurality of histograms is associated with a position within the sets of transform coefficients, to generate a plurality of probability distribution parameters, means for partitioning the probability distribution parameters based on orientation bands and frequency bands associated with the sets of transform coefficients, and means for generating at least a first feature based on probability distribution parameters from a first band of the orientation bands and frequency bands.

Further to the third embodiments, the means for generating the features comprise means for transforming patches of the valid image to generate a plurality of sets of transform coefficients, means for fitting a probability distribution to each of a plurality of histograms, wherein each of the plurality of histograms is associated with a position within the sets of transform coefficients, to generate a plurality of probability distribution parameters, means for partitioning the probability distribution parameters based on orientation bands and frequency bands associated with the sets of transform coefficients, and means for generating at least a first feature based on probability distribution parameters from a first band of the orientation bands and frequency bands, wherein the sets of transform coefficients comprise discrete cosine transform (DCT) coefficients, the probability distribution comprises a generalized Gaussian distribution (GDD), and the first feature comprises a mean of the probability distribution parameters from the first band.

Further to the third embodiments, the means for generating the features comprise means for transforming patches of the valid image to generate a plurality of sets of transform coefficients, means for fitting a probability distribution to each of a plurality of histograms, wherein each of the plurality of histograms is associated with a position within the sets of transform coefficients, to generate a plurality of probability distribution parameters, means for partitioning the probability distribution parameters based on orientation bands and frequency bands associated with the sets of transform coefficients, means for generating at least a first feature based on probability distribution parameters from a first band of the orientation bands and frequency bands, and means for generating a second feature as a ratio of a mean of the probability distribution parameters from the first band and a mean of probability distribution parameters from a second band of the orientation bands and frequency bands.

Further to the third embodiments, the means for generating the features comprise means for transforming patches of the valid image to generate a plurality of sets of transform coefficients, means for fitting a probability distribution to each of a plurality of histograms, wherein each of the plurality of histograms is associated with a position within the sets of transform coefficients, to generate a plurality of probability distribution parameters, means for partitioning the probability distribution parameters based on orientation bands and frequency bands associated with the sets of transform coefficients, and means for generating at least a first feature based on probability distribution parameters from a first band of the orientation bands and frequency bands, wherein the probability distribution comprises a generalized Gaussian distributions (GDD) and the plurality of probability distribution parameters comprise GDD shape parameters, GDD variances, GDD means of absolute values, and GDD standard deviations.

Further to the third embodiments, the image quality based feature comprises at least one of a sharpness, a noise, a dynamic range, or an illumination of the valid image.

Further to the third embodiments, the candidate image comprises at least one of a still image or a video frame and the mapping comprises a dynamically trained mapping.

In one or more fourth embodiments, at least one machine readable medium comprises a plurality of instructions that, in response to being executed on a device, cause the device to perform no-reference image or video evaluation by determining a candidate image is a valid image for quality evaluation based at least in part on a composition check of the candidate image or a category check of the candidate image, generating features associated with the valid image, wherein the features comprise at least one natural scene statistics based feature and at least one image quality based feature, and determining an image evaluation indicator associated with the valid image based on a mapping of the generated features to the image evaluation indicator.

Further to the fourth embodiments, the machine readable medium comprises further instructions that, in response to being executed on the device, cause the device to perform no-reference image or video evaluation by determining a probability the candidate image is associated with a predetermined target category based on natural scene statistics associated with the candidate image, performing the category check by comparing the probability to a threshold, applying a flat region detector to the candidate image to determine a percentage of the candidate image including flat regions, and performing the composition check by comparing the percentage to a threshold.

Further to the fourth embodiments, the machine readable medium comprises further instructions that, in response to being executed on the device, cause the device to perform no-reference image or video evaluation by determining a camera evaluation indicator associated with a camera used to capture the valid image based on a plurality of image evaluation indicators comprising the image evaluation indicator.

Further to the fourth embodiments, the machine readable medium comprises further instructions that, in response to being executed on the device, cause the device to perform no-reference image or video evaluation by transforming patches of the valid image to generate a plurality of sets of transform coefficients, fitting a probability distribution to each of a plurality of histograms, wherein each of the plurality of histograms is associated with a position within the sets of transform coefficients, to generate a plurality of probability distribution parameters, partitioning the probability distribution parameters based on orientation bands and frequency bands associated with the sets of transform coefficients, and generating at least a first feature based on probability distribution parameters from a first band of the orientation bands and frequency bands.

Further to the fourth embodiments, the image quality based feature comprises at least one of a sharpness, a noise, a dynamic range, or an illumination of the valid image.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for performing no-reference image or video evaluation comprising:
  determining a candidate image is a valid image for quality evaluation based at least in part on a composition check of the candidate image or a category check of the candidate image;
  generating features associated with the valid image, wherein the features comprise at least one natural scene statistics based feature and at least one image quality based feature and generating the features comprises:
    transforming patches of the valid image to generate a plurality of sets of transform coefficients;
    fitting a probability distribution to each of a plurality of histograms, wherein each of the plurality of histograms is associated with a position within the sets of transform coefficients, to generate a plurality of probability distribution parameters;
    partitioning the probability distribution parameters based on orientation bands and frequency bands associated with the sets of transform coefficients; and
    generating at least a first feature based on probability distribution parameters from a first band of the orientation bands and frequency bands; and
  determining an image evaluation indicator associated with the valid image based on a mapping of the generated features to the image evaluation indicator.

2. The method of claim 1, wherein determining the candidate image is a valid image comprises:
  determining a probability the candidate image is associated with a predetermined target category based on natural scene statistics associated with the candidate image; and
  performing the category check by comparing the probability to a threshold.

3. The method of claim 2, wherein the predetermined target category comprises at least one of a landscape category, an indoor arrangement category, an indoor flat surface category, or an outdoor night capture category.

4. The method of claim 1, wherein determining the candidate image is a valid image comprises:
  applying a flat region detector to the candidate image to determine a percentage of the candidate image including flat regions; and
  performing the composition check by comparing the percentage to a threshold.

5. The method of claim 1, further comprising:
  presenting, to a user via a display, one or more image capture indicators for capturing the candidate image, wherein the image capture indicators comprise at least one of a scene composition indicator, an illumination indicator, or an example image.

6. The method of claim 1, further comprising:
  determining a camera evaluation indicator associated with a camera used to capture the valid image based on a plurality of image evaluation indicators comprising the image evaluation indicator.

7. The method of claim 6, wherein a portion of the plurality of image evaluation indicators comprises image evaluation indicators that are each associated with an image category of a plurality of image categories.

8. The method of claim 1, wherein the sets of transform coefficients comprise discrete cosine transform (DCT) coefficients, the probability distribution comprises a generalized Gaussian distribution (GDD), and the first feature comprises a mean of the probability distribution parameters from the first band.

9. The method of claim 1, further comprising:
  generating a second feature as a ratio of a mean of the probability distribution parameters from the first band and a mean of probability distribution parameters from a second band of the orientation bands and frequency bands.

10. The method of claim 1, wherein the probability distribution comprises a generalized Gaussian distributions (GDD) and the plurality of probability distribution parameters comprise GDD shape parameters, GDD variances, GDD means of absolute values, and GDD standard deviations.

11. The method of claim 1, wherein the image quality based feature comprises at least one of a sharpness, a noise, a dynamic range, or an illumination of the valid image.

12. The method of claim 1, wherein the candidate image comprises at least one of a still image or a video frame and the mapping comprises a dynamically trained mapping.

13. A system for performing no-reference image or video evaluation comprising:
a memory configured to receive a valid image for quality evaluation; and
a central processor coupled to the memory, the central processor to:
determine a candidate image is the valid image for quality evaluation based at least in part on a composition check of the candidate image or a category check of the candidate image;
generate features associated with the valid image, wherein the features comprise at least one natural scene statistics based feature and at least one image quality based feature and to generate the features comprises the central processor to:
transform patches of the valid image to generate a plurality of sets of transform coefficients;
fit a probability distribution to each of a plurality of histograms, wherein each of the plurality of histograms is associated with a position within the sets of transform coefficients, to generate a plurality of probability distribution parameters;
partition the probability distribution parameters based on orientation bands and frequency bands associated with the sets of transform coefficients; and
generate at least a first feature based on probability distribution parameters from a first band of the orientation bands and frequency bands; and
determine an image evaluation indicator associated with the valid image based on a mapping of the generated features to the image evaluation indicator.

14. The system of claim 13, wherein the central processor to determine the candidate image is the valid image comprises the central processor to determine a probability the candidate image is associated with a predetermined target category based on natural scene statistics associated with the candidate image, perform the category check by comparing the probability to a threshold, apply a flat region detector to the candidate image to determine a percentage of the candidate image including flat regions, and perform the composition check by comparing the percentage to a second threshold.

15. The system of claim 13, wherein the central processor is further to determine a camera evaluation indicator associated with a camera used to capture the valid image based on a plurality of image evaluation indicators comprising the image evaluation indicator.

16. The system of claim 13, wherein the sets of transform coefficients comprise discrete cosine transform (DCT) coefficients, the probability distribution comprises a generalized Gaussian distribution (GDD), and the first feature comprises a mean of the probability distribution parameters from the first band.

17. The system of claim 13, wherein the image quality based feature comprises at least one of a sharpness, a noise, a dynamic range, or an illumination of the valid image.

18. The system of claim 13, further comprising:
a camera to capture the candidate image; and
a display to present one or more image capture indicators for capturing the candidate image, wherein the image capture indicators comprise at least one of a scene composition indicator, an illumination indicator, or an example image.

19. The system of claim 13, wherein the system comprises at least one of a personal computer system or a cloud computing system.

20. At least one non-transitory machine readable medium comprising a plurality of instructions that, in response to being executed on a device, cause the device to perform no-reference image or video evaluation by:
determining a candidate image is a valid image for quality evaluation based at least in part on a composition check of the candidate image or a category check of the candidate image;
generating features associated with the valid image, wherein the features comprise at least one natural scene statistics based feature and at least one image quality based feature and generating the features comprises:
transforming patches of the valid image to generate a plurality of sets of transform coefficients;
fitting a probability distribution to each of a plurality of histograms, wherein each of the plurality of histograms is associated with a position within the sets of transform coefficients, to generate a plurality of probability distribution parameters;
partitioning the probability distribution parameters based on orientation bands and frequency bands associated with the sets of transform coefficients; and
generating at least a first feature based on probability distribution parameters from a first band of the orientation bands and frequency bands; and
determining an image evaluation indicator associated with the valid image based on a mapping of the generated features to the image evaluation indicator.

21. The machine readable medium of claim 20, the machine readable medium comprising further instructions that, in response to being executed on the device, cause the device to perform no-reference image or video evaluation by:
determining a probability the candidate image is associated with a predetermined target category based on natural scene statistics associated with the candidate image;
performing the category check by comparing the probability to a threshold;
applying a flat region detector to the candidate image to determine a percentage of the candidate image including flat regions; and
performing the composition check by comparing the percentage to a threshold.

22. The machine readable medium of claim 20, the machine readable medium comprising further instructions that, in response to being executed on the device, cause the device to perform no-reference image or video evaluation by:
determining a camera evaluation indicator associated with a camera used to capture the valid image based on a plurality of image evaluation indicators comprising the image evaluation indicator.

23. The machine readable medium of claim 20, wherein the sets of transform coefficients comprise discrete cosine transform (DCT) coefficients, the probability distribution comprises a generalized Gaussian distribution (GDD), and the first feature comprises a mean of the probability distribution parameters from the first band.

24. The machine readable medium of claim 20, wherein the image quality based feature comprises at least one of a sharpness, a noise, a dynamic range, or an illumination of the valid image.

* * * * *